United States Patent [19]

Morita

[11] Patent Number: 5,429,237
[45] Date of Patent: Jul. 4, 1995

[54] MAGNETIC TAPE CASSETTE STORING CASE

[75] Inventor: Kiyoo Morita, Kanagawa, Japan

[73] Assignee: Fuji Photo Film Co., Ltd., Kanagawa, Japan

[21] Appl. No.: 205,762

[22] Filed: Mar. 4, 1994

Related U.S. Application Data

[63] Continuation of Ser. No. 914,927, Jul. 17, 1992, abandoned.

[30] Foreign Application Priority Data

Jul. 19, 1991 [JP] Japan ................. 3-064178 U

[51] Int. Cl.⁶ .................................. B65D 85/672
[52] U.S. Cl. ..................... 206/387.13; 206/387.1; 206/493
[58] Field of Search ............... 206/493, 387.1, 387.13

[56] References Cited

U.S. PATENT DOCUMENTS

| | | | |
|---|---|---|---|
| 3,620,361 | 11/1971 | Fugiwara et al. | 206/387 |
| 3,638,788 | 2/1972 | Solomon | 206/387 |
| 3,747,745 | 7/1973 | Esashi et al. | 206/387 |
| 3,896,929 | 7/1975 | Mills | 206/387 |
| 4,140,219 | 2/1979 | Somers | 206/387 |
| 4,431,237 | 2/1984 | Saito et al. | 206/387 X |
| 4,627,534 | 12/1986 | Komiyama et al. | 206/387 |
| 4,648,507 | 3/1987 | Komiyama et al. | 206/387 X |
| 5,109,982 | 5/1992 | Morita et al. | 206/387 |
| 5,186,325 | 2/1993 | Sato et al. | 206/387 X |

FOREIGN PATENT DOCUMENTS

| | | |
|---|---|---|
| 0415083 | 3/1991 | European Pat. Off. . |
| 2079394 | 11/1971 | France . |
| 3204101 | 9/1982 | Germany . |
| 8513862 | 7/1985 | Germany . |
| 2231861 | 11/1990 | United Kingdom . |

*Primary Examiner*—Bryon P. Gehman
*Attorney, Agent, or Firm*—Sughrue, Mion, Zinn, Macpeak & Seas

[57] ABSTRACT

A magnetic tape cassette storing case includes a cover member, and a casing member which is pivotally coupled to the cover member. Rotation preventing protrusions are so positioned that they are engaged with the hubs of a magnetic tape cassette whether the cassette is inserted in a first predetermined direction or in a second predetermined direction which is opposite to the first predetermined direction. Two pair of recesses for receiving the thicker portion of the cassette are formed in each of the major walls of the cover member and the casing member which, when the cassette is put in the storing case, cover the upper and lower surfaces of the cassette, in such a manner as to permit insertion of the cassette not only in the first predetermined direction but also in the second predetermined direction.

6 Claims, 4 Drawing Sheets

MAGNETIC TAPE CASSETTE STORING CASE

This is a continuation of application Ser. No. 07/914,927 filed Jul. 17, 1992, now abandoned.

BACKGROUND OF THE INVENTION

1. Field of the Invention

The present invention relates to a magnetic tape cassette storing case, and more particularly to an improvement of a magnetic tape cassette storing case which is used to store an audio magnetic tape cassette.

2. Related Art

A magnetic tape cassette for audio devices is generally put in a magnetic tape cassette storing case (hereinafter referred to merely as "a storing case", when applicable) when stored.

The magnetic tape cassette (hereinafter referred to merely as "a cassette", when applicable) has one or more front openings into which, for instance, when it is loaded in a recording and reproducing device, the magnetic head is inserted. The cassette has a magnetic tape which is loaded in it in such a manner as to travel along the inside of the front openings. In order to prevent foreign particles or dust from entering into the cassette through the front openings, the storing case is used. Moreover, the storing case is used for protection of the magnetic tape laid along the front openings and for protection of the entire cassette.

FIG. 4 shows a fundamental structure of a conventional storing case. The storing case 41 comprises: a cover member 42 having a pocket 44 into which the front end portion of the cassette 20 which includes the aforementioned front openings is inserted; and a casing member 45 with a pair of rotation preventing protrusions 47 which are inserted into shaft inserting holes 22 formed in the cassette 20. The casing member 45 has support pins extended towards each other from the inner surfaces of its right and left walls. The support pins are engaged with through-holes formed in the right and left walls of the pocket 44, so that the cover member 42 and the casing member 45 can be swung about the support pins, to open and close the storing case.

A storing case which requires a smaller stock space than the above-described storing case has been disclosed, for instance, by Unexamined Japanese Utility Patent Applications (OPI) Nos. Sho. 60-163279 and Sho. 63-52782 (the term "OPI" as used herein means an "unexamined published application").

The storing case is designed as follows: The cassette is put in the storing case in such a manner that it is opposite in the direction of insertion to the above-described conventional storing case; that is, the thicker portion of the cassette (hereinafter referred to as "a cassette thicker portion or a thicker portion or a thickened portion", when applicable) is positioned on the side of the front openings. In order to receive the cassette thicker portion, recesses are formed in the upper and lower walls of the storing case. This will be described with reference to FIG. 5 in more detail which shows an improved storing case disclosed by the aforementioned Japanese Utility Patent Application (OPI) No. 52782/1988. The storing case 51, as shown in FIG. 5, includes a cover member 52 with a pocket 54 and a casing member 55 which is pivotally coupled to the cover member 52 in a similar manner to that shown in FIG. 4. The cover member 52 and the casing member 55 have major walls 53 and 56, respectively, which cover the upper and lower surfaces of the cassette when the latter is put in the storing case. Recesses 8 and 58 for receiving the cassette thicker portion 21 are formed in the walls 53 and 56, respectively.

Owing to this structure, the storing case shown in FIG. 5 is much smaller in thickness than the one shown in FIG. 4. Hence, the stock space required for storing the case shown in FIG. 5 is smaller than that required for storing the case shown in FIG. 4. Furthermore, the reduced size renders this case far more practical to use as a portable storing case.

The inventor has conducted intensive research on the conventional storing cases shown in FIGS. 4 and 5, and found that they still have problems to be solved or improved.

The problems are as follows: For instance, in the situation where the cassette is put in the storing case shown in FIG. 4, in order to close the cover member 42, the front end portion of the cassette must be inserted into the pocket 44. On the other hand, the storing case 51 shown in FIG. 5 suffers from the following difficulties: If the front end portion of the cassette is forcibly inserted into the pocket 54, then it becomes impossible to close the cover member 53, and at worst the pocket 54 may be broken. That is, in the conventional storing cases, the cassette inserting direction has been fixedly determined. Hence, if the cassette is erroneously inserted in the opposite direction, then it must be turned over to place it in the storing case. As such the conventional storing cases are not convenient in practical use. Furthermore, use of the storing case may result in damage of the cassette.

There is also available a storing case smaller in thickness which is designed as follows: In the case of this storing case, the cassette inserting direction is opposite to that of the storing case shown in FIG. 5. Almost all the major wall of the pocket 54 is removed as indicated by the phantom lines 19 so that its small portions remain merging with the right and left walls of the pocket, and recesses 58 are formed on the side of the pocket. With the storing case thus constructed, the cassette may be inserted not only in one predetermined direction but also in the opposite direction; that is, the cassette inserting direction may be mistaken. As a result, it is rather difficult to quickly and accurately insert the cassette into the storing case. That is, the storing case is lower in operability.

SUMMARY OF THE INVENTION

In view of the foregoing, an object of this invention is to provide a magnetic tape cassette storing case which is free from the difficulty that time and labor are wasted by insertion of a cassette in the wrong direction.

The foregoing object of this invention has been achieved by the provision of a magnetic tape cassette storing case comprising: a cover member for holding a magnetic tape cassette by locking a part of the magnetic tape cassette; and a casing member with rotation preventing protrusions which is pivotally coupled to the cover member so as to open and close the storing case, in which, according to the invention, the rotation preventing protrusions are so positioned as to be able to engage with the hubs of the magnetic tape cassette whether the magnetic tape cassette is inserted in a first predetermined direction or whether the magnetic tape cassette is inserted in a second predetermined direction which is opposite to the first predetermined direction, and two recesses for receiving the thicker portion of the magnetic tape cassette are formed in each of the major walls of the cover member and the casing member which are confronted with each other when the storing case is closed, the recesses being so positioned as to permit insertion of the magnetic tape cassette not only in the first predetermined direction but also in the second predetermined direction.

DESCRIPTION OF THE PREFERRED EMBODIMENT

Figure 1:
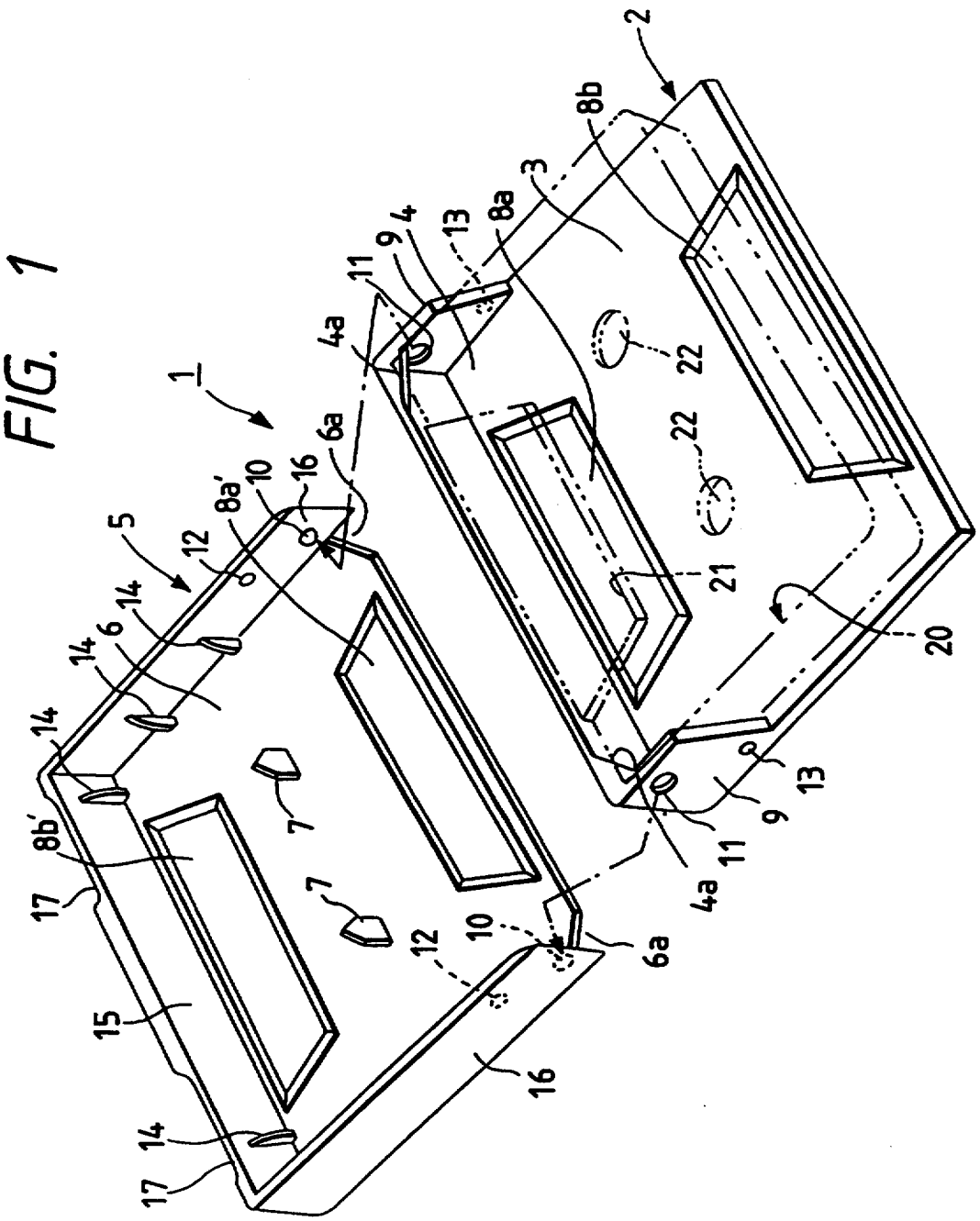
FIG. 1 is an exploded perspective view showing a magnetic tape cassette storing case, which constitutes a first embodiment of this invention.
Figure 2:
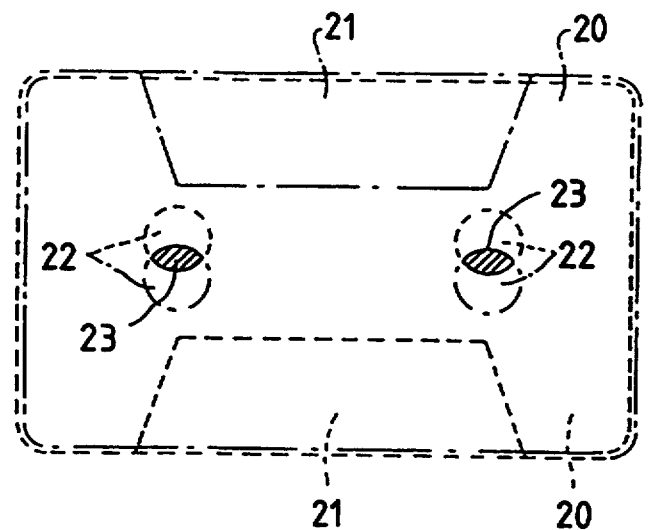
FIG. 2 is a plan view showing the positions of a cassette which is inserted into its storing case in a predetermined direction and in the opposite direction.

A magnetic tape cassette storing case, which constitutes a first embodiment of this invention, will be described with reference to FIGS. 1 and 2. FIG. 1 is an exploded perspective view of the storing case, and FIG. 2 is a plan view showing the positions of a magnetic tape cassette which is inserted in the storing case in opposite directions.

As shown in FIG. 1, the storing case 1 of the invention comprises: a cover member 2; and a casing member 5. The cover member 2 has a pocket 4 with cassette retainers 4a which are adapted to lock a cassette 20 at the right and left corners so as to hold the cassette 20. The casing member 5 has a pair of rotation preventing protrusions 7 which are to be inserted into the hub holes 22 of the cassette 20.

The casing member 5 has support pins 10 extended towards each other from the inner surfaces of its right and left walls 16. The support pins 10 are engaged with through-holes 11 formed in the right and left side walls 9 of the pocket 4, so that the cover member 2 and the casing member 5 can be swung with respect to each other about the support pins, to open and close the storing case. A pair of protrusions 13 are formed on the outer surfaces of the right and left side walls 9 of the pocket 4. The protrusions 13 thus formed are engaged with a pair of small round recesses 12 formed in the inner surfaces of the right and left sides 16 of the casing member 5, respectively, so that the storing case 1 is prevented from being opened unintentionally. Recesses 8a and 8b, and 8a' and 8b' are formed in the major walls 3 and 6 of the cover member 2 and the casing member 5, which cover the upper and lower surfaces of the cassette put in the storing case, so as to receive the cassette thicker portion 21 near the pivotal end of the storing case or near the opposite end.

The casing member 5 has a pair of cuts, namely, notches 6a, which, when the storing case 1 is closed, are engaged with the cassette retainers 4a respectively.

Each of the aforementioned recesses 8a, 8a', 8b and 8b' is made trapezoidal in shape to receive the cassette thicker portion 21.

Finger-placing recesses 17 are formed in the front end wall 15 of the casing member 5, so that, in opening the cover member 2, the fingers are placed in the finger-placing recesses 17. If necessary, positioning ribs 14 are formed on the inner surfaces of the front end wall and the side walls 16 of the casing member 5, to set the cassette in position.

The cassette 20 may be put in the storing case 1 as follows: As indicated by the phantom lines in FIG. 1, the front end portion of the cassette which includes the cassette thicker portion 21 may be inserted into the pocket 4 (this cassette inserting direction being referred to as "a first cassette inserting direction or first predetermined direction"), or the cassette may be inserted into the storing case in such a manner that the cassette thicker portion 21 is received by the recesses 8b and 8b' (this cassette inserting direction being referred to as "a second cassette inserting direction or second predetermined direction" opposite to the first cassette inserting direction).

In the case where the cassette is inserted in the above-described manner, the positions of the hub holes 22 are shifted as shown in FIG. 2. More specifically, the positions of the hub holes 22 provided in the case where the cassette is inserted into the storing case in the first cassette inserting direction are shifted from those of the hub holes 22 provided when the same cassette is inserted into it in the second cassette direction. However, it should be noted that, although the hub holes 22 are shifted as was described above, they have common regions 23. The rotation preventing protrusions 7 are so positioned and shaped that they can be inserted into the narrow common regions 23.

Another example of the magnetic tape cassette storing case, which constitutes a second embodiment of this invention, will be described with reference to FIG. 3. The second embodiment is different from the above-described first embodiment in that the rotary axis of the pivotal end portions of the cover member 2 and the casing member 5 extends along the direction of the short side of storing case, and that, of the recesses 8a and 8b, those of the cover member 2 are extended near to the case opening end Op. The remaining features or analogous to those of the above-described first embodiment. Therefore, in FIG. 3, parts functionally corresponding to those which have been described with reference to FIG. 1 are therefore described by the same reference numerals or characters.

Since the recesses 8a and 8b are extended near to the case opening end Op, the cassette 20 can be smoothly inserted into the cover member 2 or removed from it; that is, the cassette thicker portion 21 is not caught by the recesses 8a and 8b while being inserted into the cover member or removed therefrom. In addition, the side walls 9 of the cover member 2 may serve as guides when the cassette is inserted into the cover member or removed therefrom.

Figure 3:
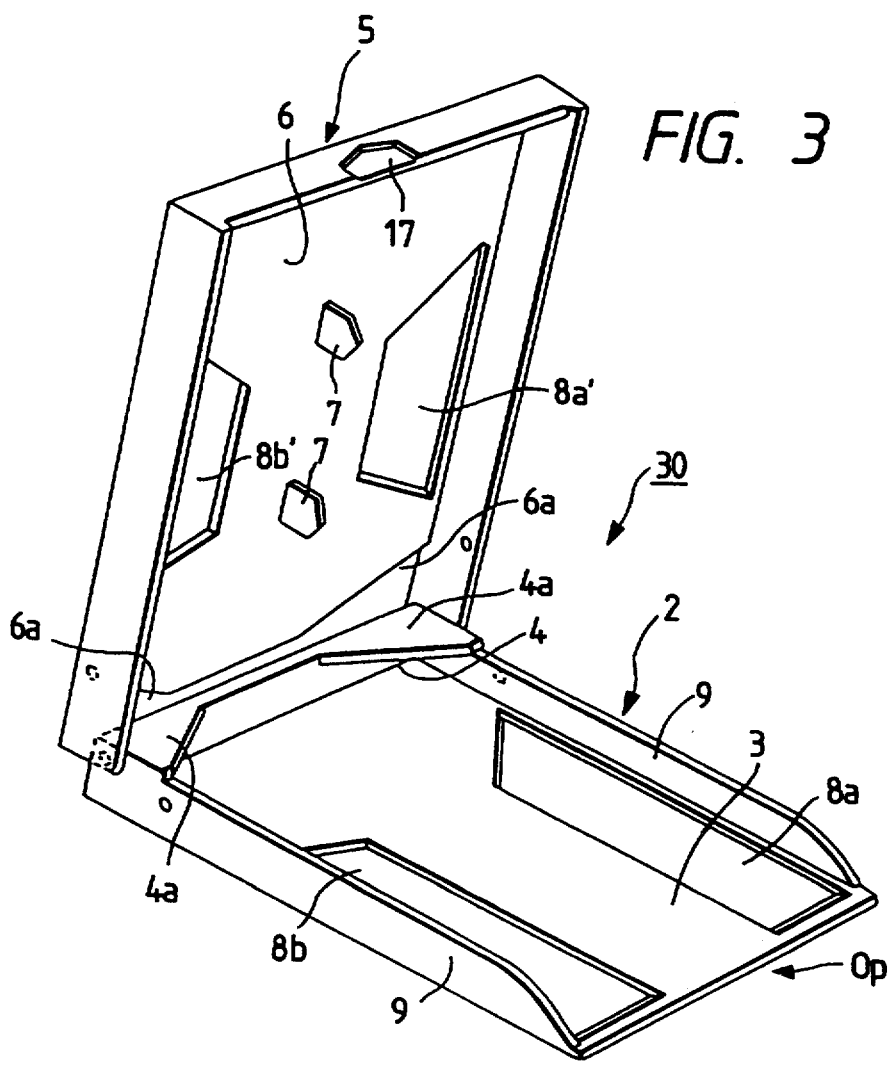
FIG. 3 is a perspective view of a modification of the magnetic tape cassette storing case, which constitutes a second embodiment of the invention.
Figure 4:
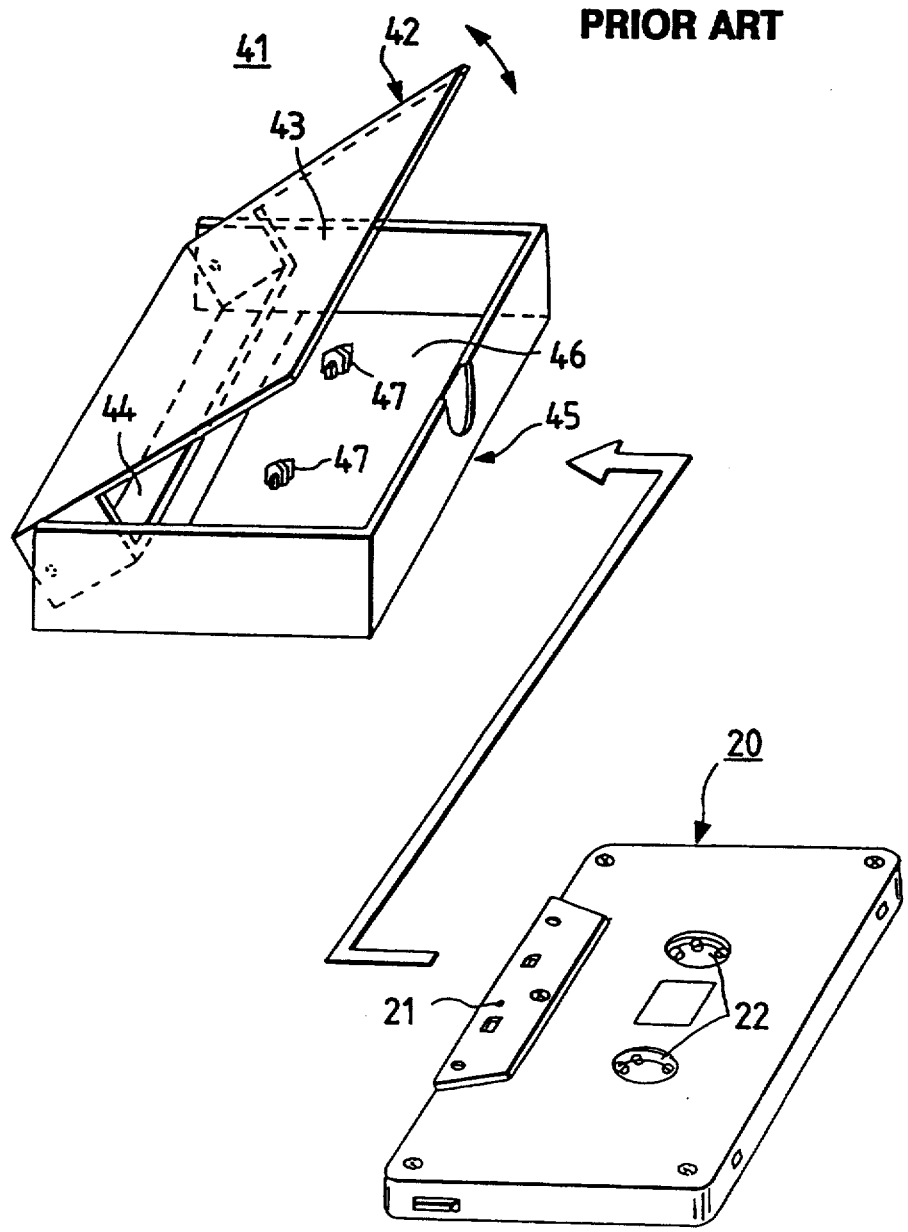
FIG. 4 is a perspective view showing an example of a conventional magnetic tape cassette storing case.
Figure 5:
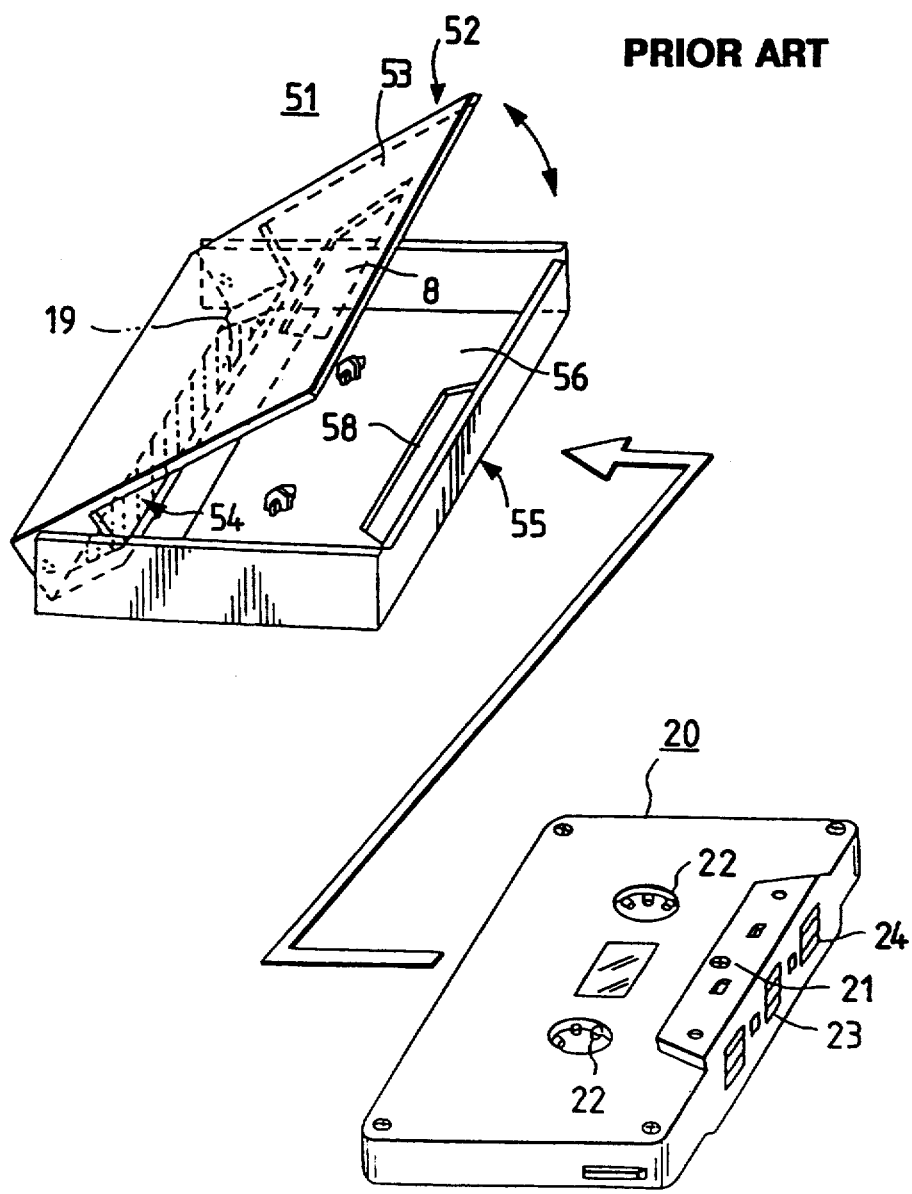
FIG. 5 is a perspective view showing another example of conventional magnetic tape cassette storing case.

In the storing case shown in FIG. 3, the cassette retainers 4a are triangular; however, the pocket 4 may be the same as the conventional one shown in FIG. 4.

While the invention has been described in connection with preferred embodiments of this invention, it should be noted that the invention is not limited thereto or thereby. For instance, the configurations of the recesses, of the rotation preventing protrusions, and of the cassette retainers may be changed or modified in various manners. The rotation preventing protrusions may be formed of a material different from the material of the case body; for instance, they may be elastic members bonded to the case body, or may be formed by two-color molding. In the case where the rotation preventing protrusions are formed of elastic material, rotation of the hubs can be prevented merely by bringing the rotation preventing protrusions into contact with the hubs.

As was described above, in the storing case of the invention, the rotation preventing protrusions are so positioned that they can be engaged with the hubs of the cassette whether the cassette is inserted into the cover member in the first predetermined direction or whether it is inserted thereinto in the second predetermined direction opposite to the first predetermined direction. Further, in order to receive the thicker portion of the magnetic tape cassette, two recesses are formed in each of the major walls of the cover member and the casing member which, when the magnetic tape cassette is put in the storing case, cover the upper and lower surfaces of the magnetic tape cassette, the recesses being so positioned as to permit insertion of the magnetic tape cassette not only in the first predetermined direction but also in the second predetermined direction.

Hence, whether the cassette is inserted into the storing case in the first predetermined direction or in the second predetermined direction, the hubs of the cassette are prevented from being turned, and the thicker portion of the latter is received by the recesses. That is, insertion of the cassette may be made not only in the first predetermined direction but also in the second predetermined direction. Therefore, the storing case is free from the difficulty that time and labor are wasted by insertion of the cassette in the wrong direction as in the case of the conventional storing case. Furthermore, according to the invention, the storing case is decreased in thickness, and it can be handled readily in putting the cassette into it.

What is claimed is:

1. A storing case for retaining a magnetic tape cassette or a type having a pair of tape spools and a thickened portion, comprising: a cover member and a casing member, said cover member and said casing member being separately molded and including pivotal coupling portions for pivotally coupling said cover member and said casing member to one another, said cover member and said casing member having respective generally rectangularly shaped major walls and side edge portions cooperating to define a sealed space when said cover member and said casing member are closed against one another, a pair of generally trapezoidally shaped recess portions being formed in each of said major walls, each of said recess portions having a long edge extending parallel to and adjacent a respective opposed long edge portion of a respective one of said major walls, and a pair of protrusions being formed on an inner surface of one of said cover member and said casing member, each of said protrusions being spaced an equal distance along said inner surface from said recess portions formed therein, and said protrusions being shaped to engage the tape spools of a retained cassette solely in a pair of common regions of hub holes defined by the tape spools, wherein the cassette, having a thickened portion corresponding in shape to said recess portions so as to be receivable therein, can be retained in said storing case in any of four orientations, such that said pair of protrusions engage the tape spools in any of the four orientations and wherein the cassette retained in said storing case in any of the four orientations occupies substantially the same positional space in said storing case regardless of the orientation, and occupies substantially all of the sealed space defined by said major walls and said side edge portions.

2. A storing case according to claim 1 wherein said cover member comprises a cassette-retaining pocket.

3. A storing case according to claim 2, wherein:

said storing case is lengthier in a first direction than it is in a second direction perpendicular to the first direction;

said pivotal coupling portions form a rotary axis extending along the lengthier direction of the storing case;

said pocket comprises cassette retainers formed and positioned proximate to said pivotal coupling portions; and said recess portions of said cover member and of said casing member are positioned in the cover member major wall and in the casing member major wall, respectively, such that a first of the recessed portions extends along the rotary axis proximate to the axis, and a second of the recessed portions extends along the rotary axis remote from the axis.

4. A storing case according to claim 2, wherein:

said storing case is shorter in a first direction than it is in a second direction perpendicular to the first direction;

said pivotal coupling portions form a rotary axis extending along the shorter direction of the storing case;

said pocket comprises cassette retainers formed and positioned proximate to said pivotal coupling portions; and said recess portions of said cover member and of said casing member are positioned in the cover member major wall and in the casing member major wall, respectively, such that the recessed portions occupy opposing areas with respect to one another, and both recessed portions extend in a direction perpendicular to the rotary axis.

5. A storing case according to claim 1, wherein said pair of protrusions is formed on the inner surface of said casing member.

6. A storing case according to claim 1, wherein said side edge portions of said cover member and said casing member comprise:

a first side wall forming part of said cover member and extending along an edge of said major wall of said cover member, which edge runs parallel to and proximate to a rotary axis formed by said pivotal coupling portions; and second, third and fourth side walls forming part of said casing member.

* * * * *